United States Patent [19]
Yonezawa

[11] Patent Number: 5,383,058
[45] Date of Patent: Jan. 17, 1995

[54] ZOOM LENS

[75] Inventor: Yasuo Yonezawa, Yokohama, Japan

[73] Assignee: Nikon Corporation, Tokyo, Japan

[21] Appl. No.: 93,723

[22] Filed: Jul. 20, 1993

Related U.S. Application Data

[63] Continuation of Ser. No. 849,459, Mar. 11, 1992, abandoned.

[30] Foreign Application Priority Data

Apr. 1, 1992 [JP] Japan .................. 3-092635

[51] Int. Cl.⁶ ............................................. G02B 15/14
[52] U.S. Cl. .................. 359/687; 359/380; 359/684
[58] Field of Search ............ 359/677, 687, 684, 659, 359/656, 379, 380

[56] References Cited

U.S. PATENT DOCUMENTS 5,009,492 4/1991 Hamano .................. 359/687 X
5,138,492 8/1992 Hamano et al. .................. 359/684

FOREIGN PATENT DOCUMENTS 2-66509 3/1990 Japan .
2-54925 11/1990 Japan .

*Primary Examiner*—Scott J. Sugarman
*Attorney, Agent, or Firm*—Shapiro and Shapiro

[57] ABSTRACT

A zoom lens of a four-group structure comprises the following sequentially from the object side, a first lens group having positive refracting power, a second lens group having negative refracting power, a third lens group having positive refracting power and a fourth lens group having positive refracting power. When a variable power takes place from the wide angle end to the telescopic end, at least the second lens group is driven along the optical axis relatively so that the distance between-the first lens group and second lens group is increased and at the same time, the fourth lens group is driven toward the image side.

27 Claims, 8 Drawing Sheets

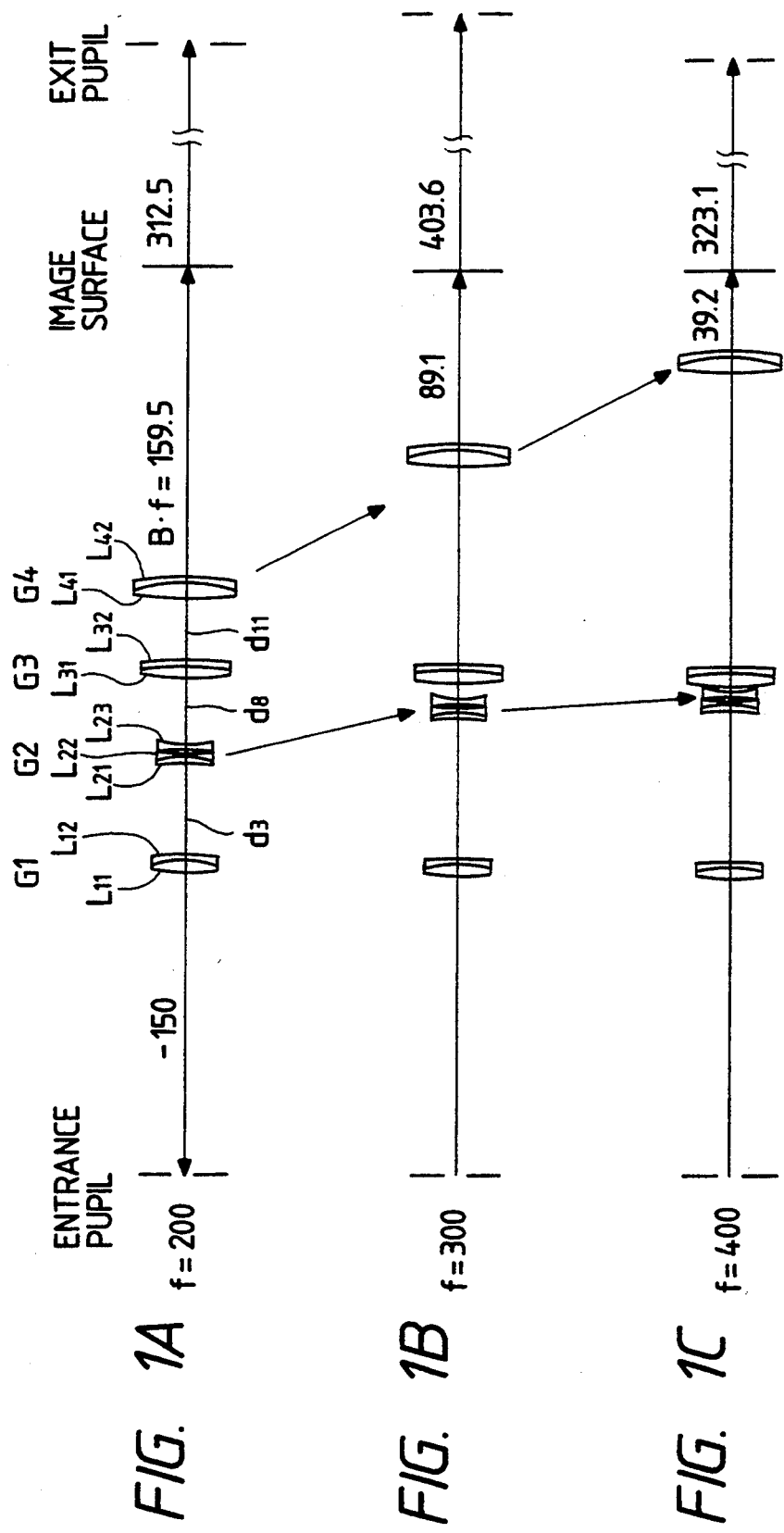

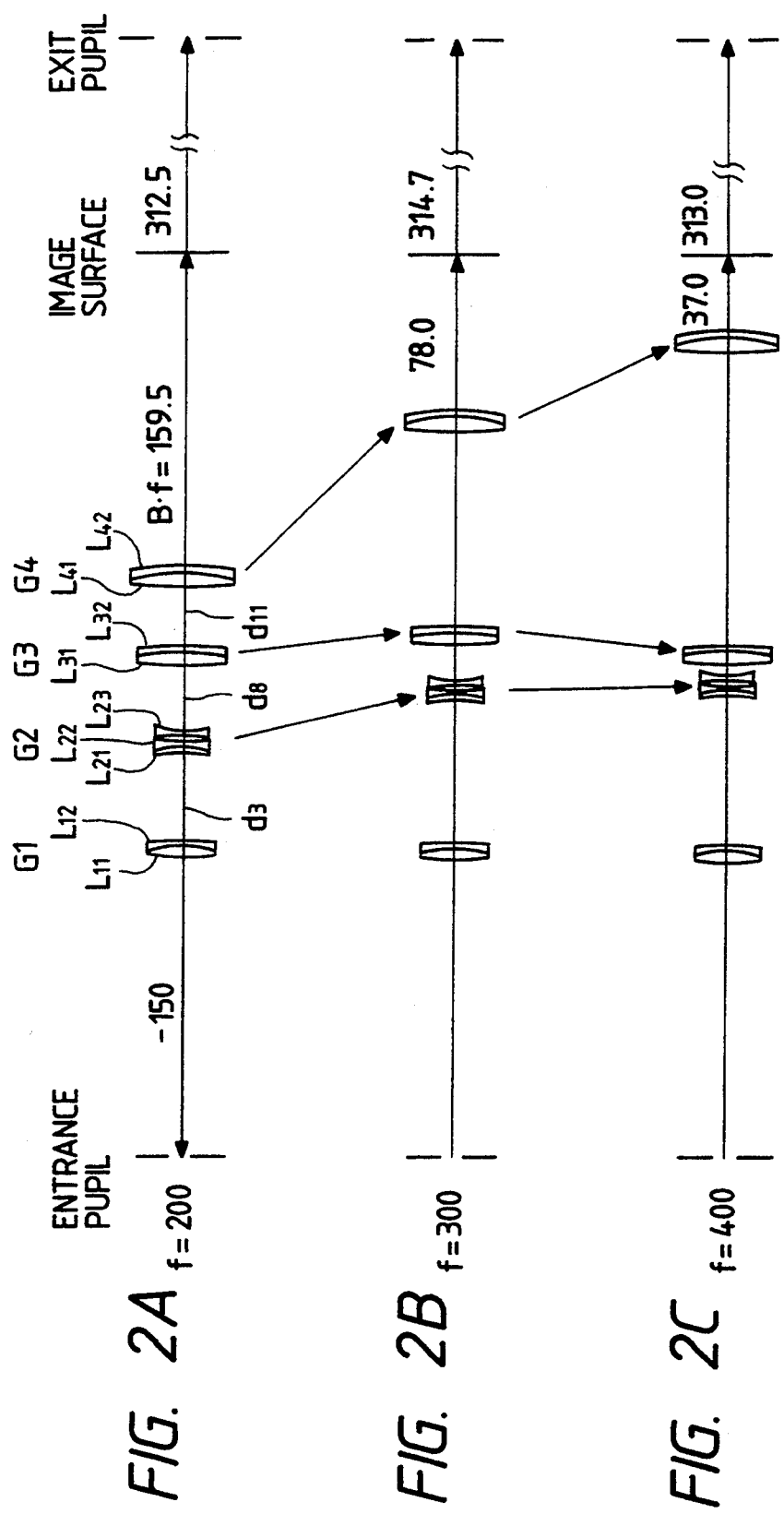

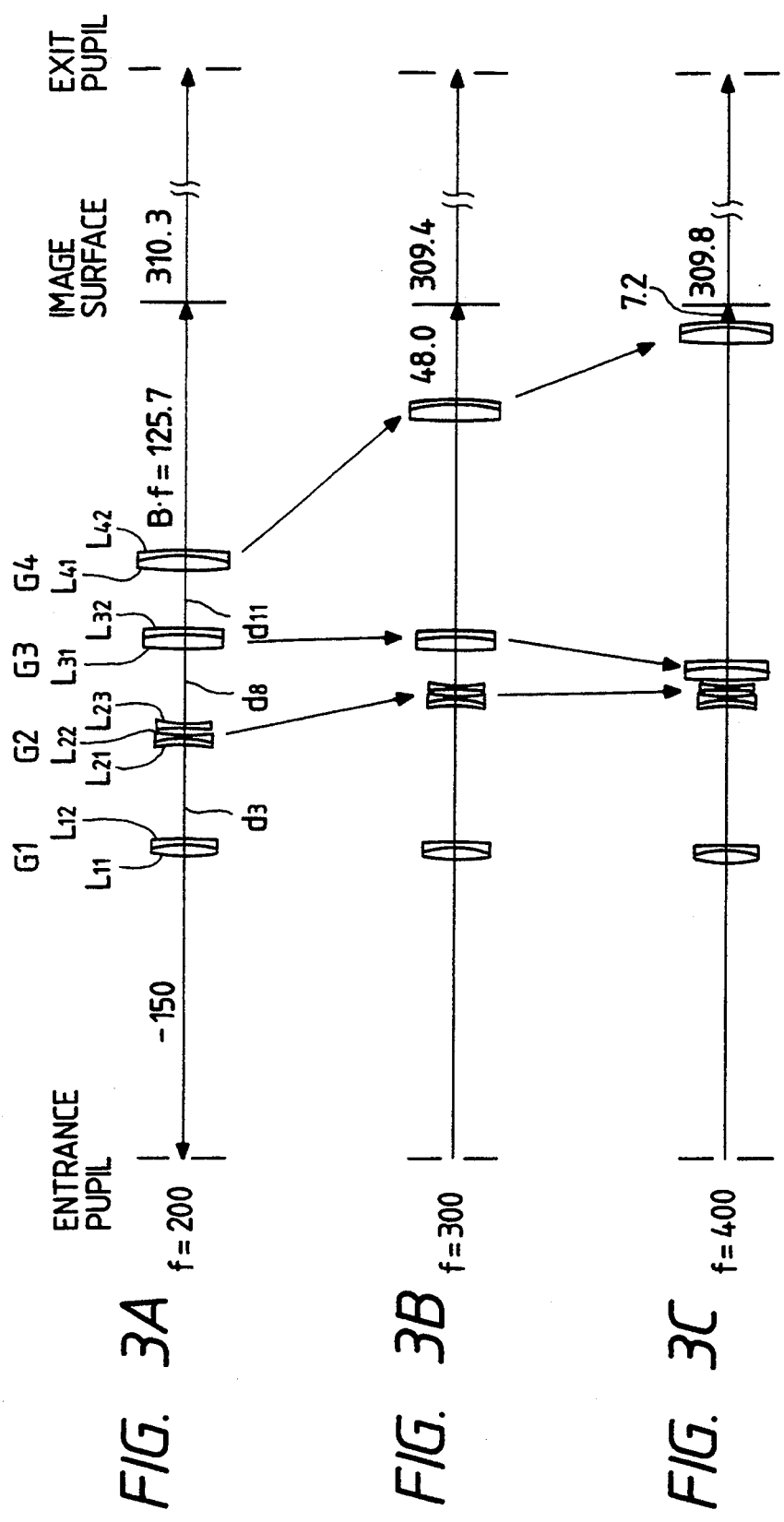

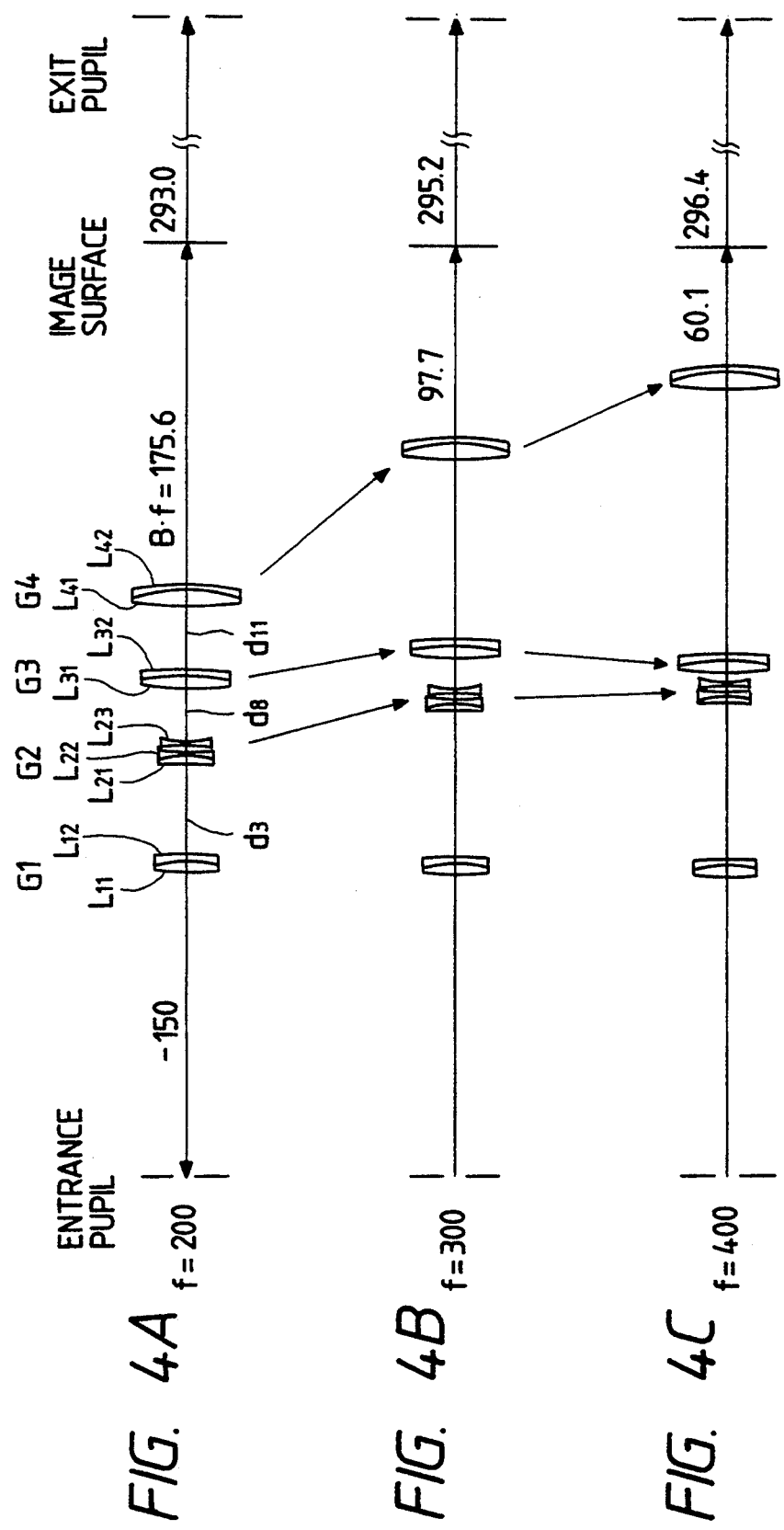

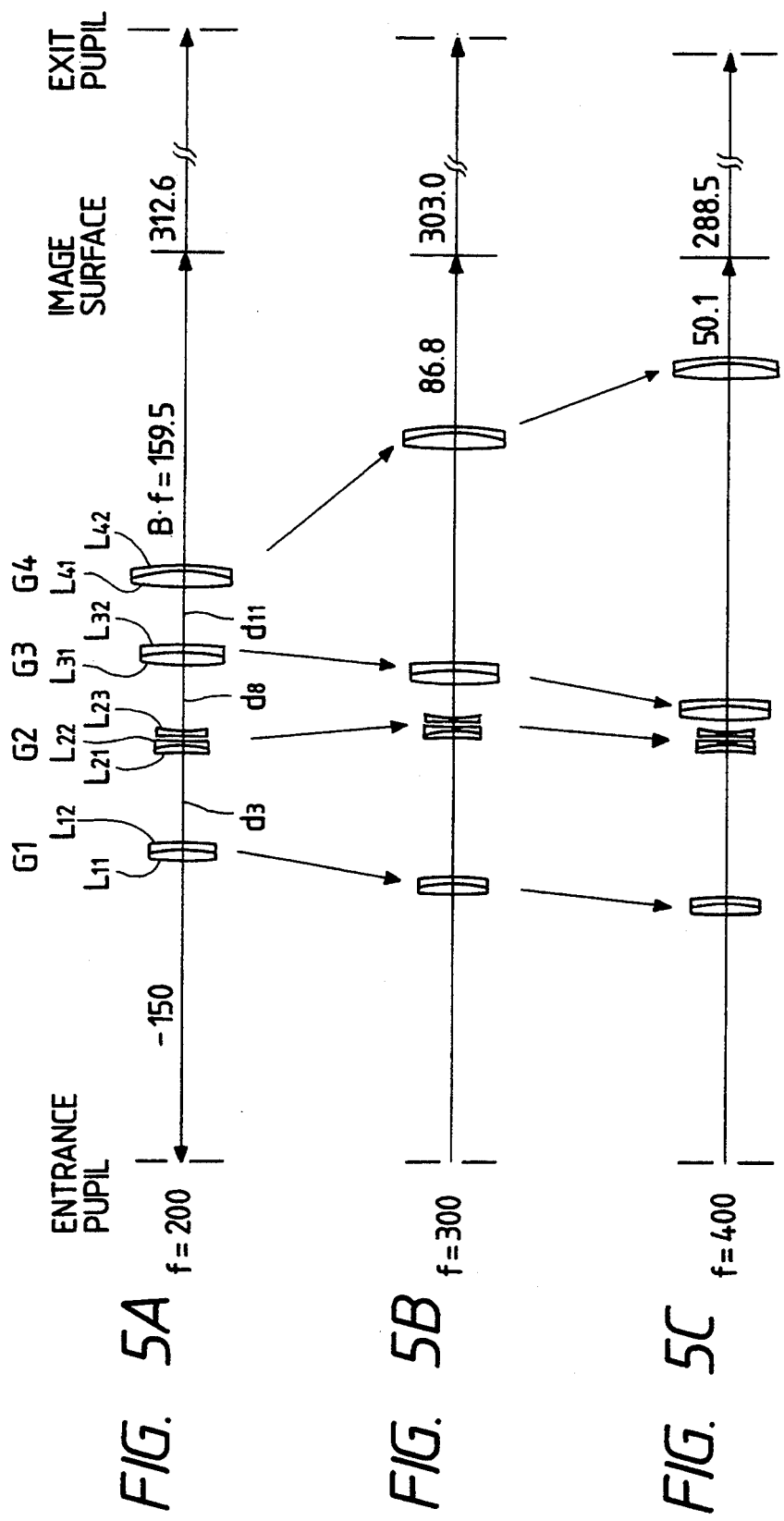

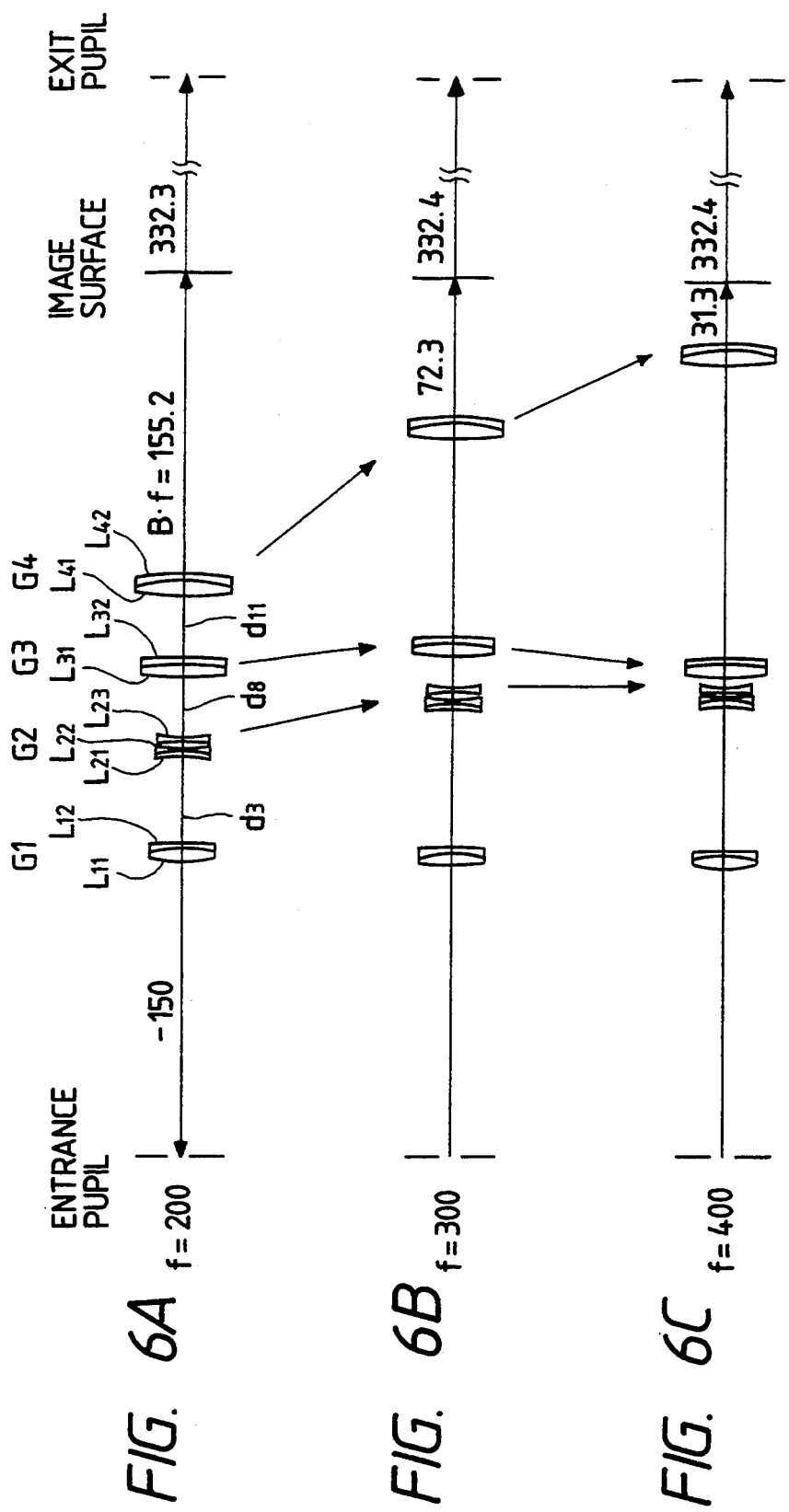

ZOOM LENS

This is a continuation of application Ser. No. 849,459 filed Mar. 11, 1992, now abandoned.

BACKGROUND OF THE INVENTION

1. Field of the Invention

The present invention relates to a zoom lens. More particularly, the invention relates to a zoom lens which is structured to arrange its entrance pupil further on the object side than the first plane of the lens on the object side such as a zoom tube lens for a microscope.

2. Related Background Art

Traditionally, there have been known for a zoom tube lens for a microscope of the kind, a zoom lens of a four-group construction having positive, negative, negative, and positive refracting powers sequentially from the object side and a zoom lens of a three-group construction having positive, negative, and positive refracting powers as the embodiments disclosed in Japanese Patent Publication No. 2-54925, for example. The above-mentioned zoom lenses are both of such a structure that zooming is performed by driving the second lens group and third lens group.

Also, there is known a zoom lens of a four-group construction having positive, negative, positive, and positive powers, which is widely employed for a phototaking zoom lens as disclosed in Japanese Patent Laid-Open Application No. 2-66509, for example. This zoom lens is of such a structure that the first, third, and fourth lens groups are driven together toward the object side when zooming is performed from the wide angle side to the telescopic side.

In the conventional zoom lenses disclosed in the Japanese Patent Publication No. 2-54925 and Japanese Patent Laid-Open Application No. 2-66509 as mentioned above, the exit pupil of these zoom lenses is all varied by zooming if the entrance pupil is positioned further on the object side than the plane of the first lens on the object side. Consequently, when this type of zoom lens is used as a zoom tube lens for a microscope, there is a disadvantage that the position of the eye point of an eyepiece lens is varied by zooming. Also, if a relaying optical system should be inserted behind a zoom tube lens for this use, the entrance pupil for the incident light for the relaying optical system is varied by zooming. Thus, there is a disadvantage that the structure of the relaying optical system becomes complicated.

SUMMARY OF THE INVENTION

It is therefore an object of the present invention to eliminate the drawbacks of the conventionally known zoom lenses set forth above and to provide a zoom lens having its entrance pupil further on the object side than the first plane of the lens on the object side while the variation of its exit pupil caused by zooming being extremely small.

In order to achieve the above-mentioned object, a zoom lens according to the present invention is characterized in that it has a first lens group having positive refracting power, a second lens group having negative refracting power, a third lens group having positive refracting power, and a fourth lens group having positive refracting power, and that when a variable power takes place from the wide angle end to the telescopic end, at least the second lens group is driven along the optical axis relatively so that the distance between the first lens group and second lens group is increased and at the same time, the fourth lens group is driven toward the image side.

By the new method of driving at least the second lens group to increase the distance between the first lens group and second lens group while the fourth lens group is caused to be driven toward the image side as described above, it is possible to position the entrance pupil on the object side as well as to restrain the variation of the exit pupil to be extremely small when a variable power takes place from the wide angle end to the telescopic end.

In this case, it is still desirable to construct the system to satisfy the following condition:

$$0 < (d_{12T} - d_{12W})/(Bf_W - Bf_T) \leq 1 \quad Bf_W > Bf_T$$

where
- $d_{12T}$: the space between the lens groups on the optical axis of the first lens group and second lens group at the telescopic end.
- $d_{12W}$: the space between the lens groups on the optical axis of the first lens group and second lens group at the wide angle end.
- $Bf_W$: a back focus at the wide angle end.
- $Bf_T$: a back focus at the telescopic end.

Also, given a magnification of the second lens group at the wide angle end as $\beta_{2W}$, it is desirable to construct the system to satisfy the following condition:

$$\beta_{2W} > 1 \text{ or } \beta_{2W} \leq -1$$

Furthermore, given a magnification of the fourth lens group at the wide angle end as $\beta_{4W}$, it is desirable to construct the system to satisfy the following condition:

$$-1 < \beta_{4W} < 1$$

The other objects, features, and advantages of the present invention will become sufficiently clear by reference to the detailed description of the invention set forth below in conjunction with the accompanying drawings.

BRIEF DESCRIPTION OF THE DRAWINGS

FIGS. 1A, 1B, and 1C are views schematically showing the lens arrangement of a first embodiment according to the present invention.

FIGS. 2A, 2B, and 2C are views schematically showing the lens arrangement of a second embodiment according to the present invention.

FIGS. 3A, 3B, and 3C are views schematically showing the lens arrangement of a third embodiment according to the present invention.

FIGS. 4A, 4B, and 4C are views schematically showing the lens arrangement of a fourth embodiment according to the present invention.

FIGS. 5A, 5B, and 5C are views schematically showing the lens arrangement of a fifth embodiment according to the present invention.

FIGS. 6A, 6B, and 6C are views schematically showing the lens arrangement of a sixth embodiment according to the present invention.

DESCRIPTION OF THE PREFERRED EMBODIMENTS

Hereinafter, the embodiments according to the present invention will be described in detail in conjunction with the accompanying drawings.

Figures 7A, 7B:
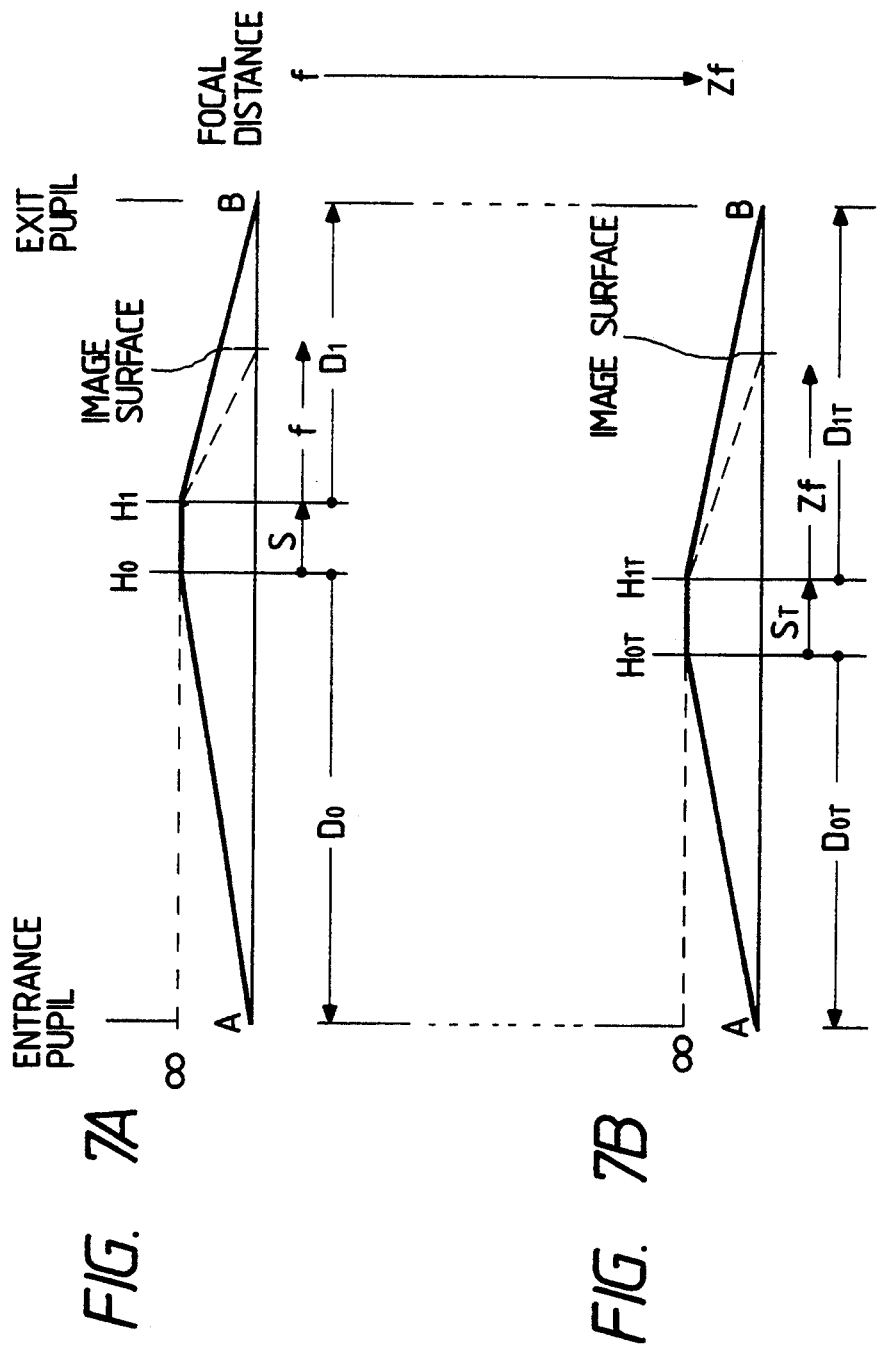
FIGS. 7A and 7B views illustrating the principle of the lens driving for a zoom lens according to the present invention.
Figure 8:
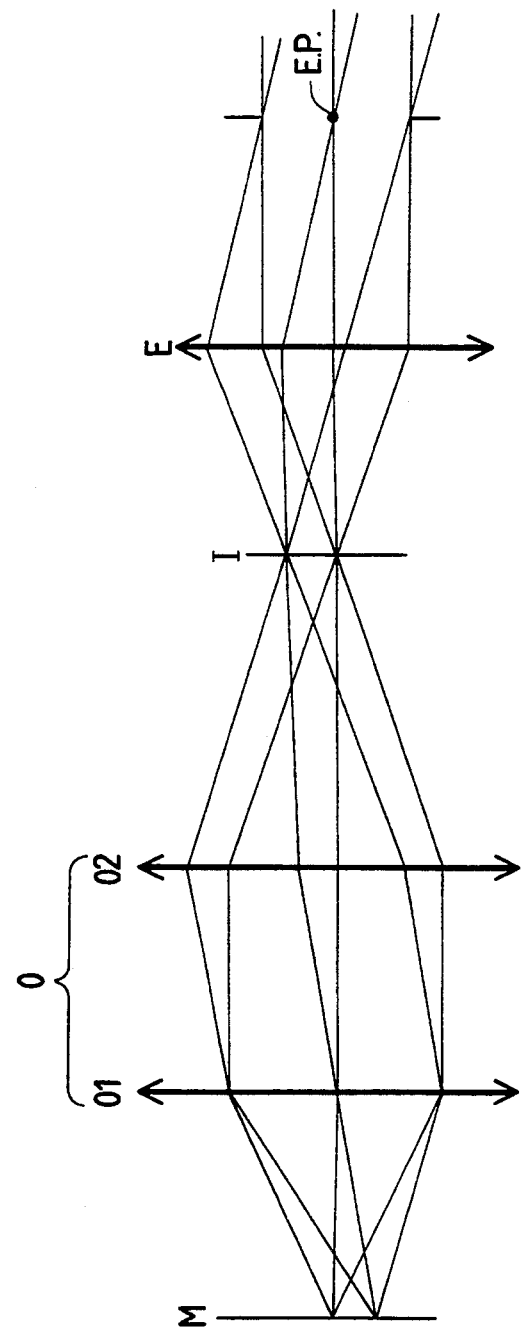
FIG. 8 is a schematic diagram illustrating the structure of the optical system for the microscope of an infinite lens barrel length type in which a zoom lens according to the present invention is incorporated.

FIGS. 1A to 1C through FIGS. 6A to 6C are views showing sequentially the structure of a first to sixth embodiment according to the present invention, respectively, and FIGS. 1A, 2A, 3A, 4A, 5A, and 6A illustrate the lens structure at the wide angle end (in a state of the minimal focal length), FIGS. 1B, 2B, 3B, 4B, 5B, and 6B illustrate the lens structure in a state of the intermediate focal length, and FIGS. 1C, 2C, 3C, 4C, 5C, and 6C illustrate the lens structure at the telescopic end (in a state of the maximal focal length). Also, FIGS. 7A and 7B are views illustrating the principle of lens driving in a zoom lens according to the present invention, and FIG. 8 is a view schematically illustrating the optical system in an infinite lens barrel length type microscope in which a zoom lens according to the present invention is incorporated.

As clear from FIGS. 1A to 1C through FIGS. 6A to 6C, each of the zoom lenses according to the embodiments has a first lens group G1 having positive refracting power, a second lens group G2 having negative refracting power, a third lens group G3 having positive refracting power, and a fourth lens group G4 having positive refracting power, and when a variable power takes places from the wide angle end to the telescopic end, the spatial interval on the optical axis between the surface of the lens of the first lens group G1 which is closest to the image side and the surface of the lens of the second lens group G2 which is closest to the object side is increased while the fourth lens group G4 is caused to be driven to the image side. Hence making it possible as a principle to maintain a well-balanced restraint on the variation of the exit pupil while performing the power variation of the entrance pupil by a driving mode such as this.

The above-mentioned zoom lens is employed for a variable power optical system for an object lens the eye point of which does not change when applied to a microscope of an infinite lens barrel length type, for example. This microscope of an infinite lens barrel length type is provided, as briefly shown in FIG. 8 schematically, with an infinity correction type object lens 0 composed of a first object lens $0_1$ which makes a light beam from a specimen M into the parallel beams and a second object lens $0_2$ (a tube lens for the use of a microscope) which converges these parallel beams to form a spatial image (an intermediate image) I, and an eyepiece lens E whereby an enlarged observation of this spatial image (intermediate image) I can be made at an eye point position E.P. The zoom lens of the present invention is a lens obtained by making the aforesaid second object lens $0_2$ capable of being zoomed. Here, in making the second object lens $0_2$ a zoom lens, it is not good enough to structure the second object lens $0_2$ simply so as to make its focal length changeable because the positional changes of the entrance pupil and exit pupil of the object lens 0, that is, the variation of the exit pupil of the object lens 0, becomes great in zooming as in the case of the conventional zoom tube lens for the microscope use. As a result, the eye point E.P. position of a microscope is significantly varied, leading not only to a difficulty in observing the specimen M but also to the degradation of the optical capability of the microscope itself.

In the present invention, therefore, the second object lens $0_2$ having a variable power function (hereinafter referred to simply as zoom lens) is fundamentally structured with four lens groups of positive, negative, positive, and positive powers, and with a new variable power driving method such that when a variable power takes place from the wide angle end to the telescopic end, the fourth lens group G4 is caused to be driven toward the image side and the space between the lens groups of the first lens group G1 and second lens group G2 is increased, it becomes possible to restrain the variation of the exit pupil due to zooming to be extremely small while performing a zooming.

Hereunder, in reference to FIGS. 7A and 7B, the description will be made in detail of the conditions which do not create any variation of the exit pupil due to zooming.

The arrangement of the refracting powers of the zoom lens is shown in FIGS. 7A and 7B. FIG. 7A illustrates the arrangement of the refracting power when the focal length of the zoom lens is f at the wide angle end while FIG. 7B illustrates the arrangement of the refracting power when the focal length of the zoom lens is Zf at the telescopic end.

In the zoom lens at the wide angle end in FIG. 7A, a reference mark He designates a front side principal point; $H_1$, a back side major point; S, a space between the principal points; f, a focal length of the zoom lens at the wide angle end; $D_0$, a distance from the front side principal point to the entrance pupil; and $D_1$, a distance from the back side major point to the exit pupil. Also, the magnification of the pupils ($D_1/D_0$) is given as $\beta$.

Also, in the zoom lens at the telescopic end in FIG. 7B, a reference mark $H_{0T}$ designates a front side principal point; $H_{1T}$, a back side principal point; $S_T$, a space between the principal points; Z, a variable power ratio (zoom ratio); Zf, the focal length of the zoom lens at the telescopic end; $D_{0T}$, a distance from the front side principal point to the entrance pupil; and $D_{1T}$, a distance from the back side principal point to the exit pupil. Also, the magnification of the pupils ($D_{1T}/D_{0T}$) is given as $\beta_T$.

Here, the condition which does not cause the position B of the exit pupil of be varied against the position A of the entrance pupil by an arbitrary zoom magnification is that the distance between the pupils should be constant. Hence from FIG. 1A and FIG. 1B, an equation given below is obtainable.

$$-D_0+S+D_1=-D_{0T}+S_T+D_{1T} \quad (1)$$

Also, from FIG. 7A and FIG. 7B, it is clear that an equation given below is obtainable.

$$D_{1T}=D_1+Zf-f \quad (2)$$

From the image formation formula for a lens, the image formation relationship between the pupils at the telescopic end in FIG. 7B can be expressed by an equation given below.

$$1/D_{1T}=(1/Zf)+(1/D_{0T}) \quad (3)$$

Then, by assigning the equation (2) to the equation (3) for an arrangement, an equation given below is obtainable.

$$D_{0T} = Zf\{D_1 + f(Z-1)\}/(f - D_1) \quad (4)$$

Also, the relationship between the pupil magnification $\beta_T$ and $D_{0T}$ and $D_{1T}$ at the telescopic end can be expressed by an equation given below.

$$\beta_T = D_{1T}/D_{0T} \quad (5)$$

Therefore, by assigning the equation (2) and equation (4) to the equation (5) for an arrangement, an equation given below can be derived.

$$\begin{aligned}
\beta_T &= (D_1 + Zf - f)/[Zf\{D_1 + f(Z-1)\}/(f-D_1)] \\
&= (f - D_1)/Zf \\
&= [1/Z] \cdot [(f - D_1)/f]
\end{aligned}$$

Here, according to Newton's formula of image formation, the following equation is formulated for the zoom lens at the wide angle end in FIG. 7A:

$$\beta = (f - D_1)/f$$

Therefore, the above-mentioned equation (6) becomes as expressed by the equations (7) and (7') given below.

$$\beta_T = \beta/Z \quad (7)$$

$$\beta_T/\beta = 1/Z \quad (7')$$

The equation (7') represents that the zoom ratio and the ratio of the magnifications of the pupils are in inverse proportion.

Also, according to the image formation formula for lens, the following equations are obtainable at the wide angle end in FIG. 7A:

$$1/D_1 = 1/f + 1/D_0 \quad (8)$$

$$D_1 = fD_0/(f + D_0) \quad (8')$$

Here, by assigning the equation (2), equation (4) and equation (8') to the equation (1) for an arrangement, the following equation is obtainable:

$$S_T - S = (Z-1)\{D_0(Z+1) + f(Z-1)\} \quad (9)$$

This equation (9) represents the condition under which the position of the exit pupil is not varied by an arbitrary zoom ratio Z.

The present invention is designed in consideration of the case where the entrance pupil is placed apart from the first plane of the zoom lens to the object side to a certain extent. Here, a case in which the distance from the entrance pupil to the front side principal point $H_0$ is longer than the focal length at the wide angle end is taken into account. In other words, a condition $$D_0 \leq -f \quad (10)$$

is considered. Then, by assigning the condition (10) to the equation (9) for an arrangement, the condition given below is derived.

$$S_T - S \leq -2f(Z-1) < 0 \quad (11)$$

where $f > 0$, $Z > 1$.

From the above-mentioned conditions (10) and (11), it is understandable that if the entrance pupil is placed on the object side further from the front side principal point $H_0$ than f (focal length at the wide angle end), the principal point distance $S_T$ at the telescopic end must be shorter than the principal point distance S at the wide angle end as the condition to maintain the exit pupil invariably.

Here, as an example, if the focal length f at the wide angle end is considered to be given as 200, the zoom ratio, as 2, and the distance from the entrance pupil to the front side principal point $H_0$, as $D_0 = -250$, then $S_T - S \leq -550$ according to the above-mentioned equation (9). In other words, in order to make the position of the exit pupil invariable in this case, the principal point distance at the telescopic end $S_T$ must be shorter than the principal point distance S at the wide angle end by 550.

Also, from the equation (7), the following conditions are obtainable:

$$D_{1T}/D_{0T} = (1/Z)(D_1/D_0)$$

$$D_0/D_{0T} = (1/Z)(D_1/D_{1T})$$

Here, $Z > 1$. Also, as clear from the FIG. 7A and FIG. 7B, $D_{1T} > D_1$. Therefore, $D_0/D_{0T} < 1$. At this juncture, the following condition is obtainable because $D_{0T} < 0$, $D_0 < 0$:

$$D_0 > D_{0T} \quad (12)$$

Further, as $D_{0T} < 0$ and $D_0 < 0$ are both negative numbers, the following condition is obtainable:

$$|D_0| < |D_{0T}| \quad (13)$$

From the condition (13), the distance from the position A of the entrance pupil to the front side principal point $H_{0T}$ at the zoom ratio Z must be longer than the distance thereof at the wide angle end. In other words, this condition indicates that when a variable power takes place from the wide angle end to the telescopic end, the position of the front side principal point must be driven in the direction toward the image.

As described above, the condition which makes the position of the exit pupil invariable by zooming is such that the distance between the principal points of an optical system is shortened when a zooming is performed from the wide angle end to the telescopic end and the front side principal point is driven in the direction toward an image.

With the above-mentioned condition thereby to restrain the variation of the pupil in view, it has been found in designing the present invention that by increasing the space between the positive first lens group G1 and the negative second lens group G2 of the four lens groups having positive, negative, positive, and positive refracting powers, the power variation can be effectuated while shortening the space between the major points, and by driving the positive fourth lens group G4 in the direction toward an image, the position of the front side principal point can be driven toward the image. In other words, according to the present invention, it becomes possible as a principle to restrain the variation of the exit pupil while effectuating the power variation with a new variable power driving method in which the space between the groups of the first lens group G1 and second lens group G2 is increased while the fourth lens group G4 is driven to the image side when a variable power takes place from the wide angle end to the telescopic end.

Thus, for a zoom lens according to the present invention, it is desirable to further satisfy a condition (101) given below on the basis of the above-mentioned variable power method.

$$0 < (d_{12T} - d_{12W})/(Bf_W - Bf_T) \leq 1 \quad Bf_W > Bf_T \qquad (101)$$

where
- $d_{12W}$: space between the groups on the optical axis of the first lens group and second lens group at the wide angle end.
- $d_{12T}$: space between the groups on the optical axis of the first lens group and second lens group at the telescopic end.
- $Bf_W$: back focus of the zoom lens at the wide angle end.
- $Bf_T$: back focus of the zoom lens at the telescopic end.

Over the upper limit of the condition (101), the amount of the variation between the first lens group G1 and second lens group G2 becomes great when a variable power (zooming) takes place from the wide angle end to the telescopic end. Therefore, although it is advantageous to gain a large ratio of the variable powers (zoom ratio), the driving amount of the fourth lens group G4 toward the image side becomes too small as compared with the increased amount of the space between the groups of the first lens group G1 and second lens group G2 on the optical axis. As a result, as compared with the amount reduced between the principal points of the zoom lens, the driving amount of the front side major point of the zoom lens becomes too small, hence making it difficult to correct the variation of the exit pupil. On the contrary, under the lower limit of the condition (101), the space between the groups of the first lens group G1 and second lens group G2 on the optical axis is not increased when a variable power (zooming) takes place from the wide angle end to the telescopic end. Consequently, not only it becomes difficult to gain a sufficient variable power ratio (zoom ratio), but also it is impossible to make the space between the principal point sufficiently small at the telescopic end as compared with the one at the wide angle end. As a result, the variation of the exit pupil can hardly be restrained.

Also, given the magnification of the second lens group G2 at the wide angle end of a zoom lens according to the present invention as $\beta_{2W}$, it is preferable to satisfy the condition expressed by the following condition:

$$\beta_{2W} > 1 \text{ or } \beta_{2W} \leq -1 \qquad (102)$$

Beyond the range of the condition (102), the condition given below will result. In other words, when the magnification $\beta_{2W}$ of the second lens group G2 is $-1 < \beta_{2W} < 0$, the oblique rays are diverged greatly by the second lens group G2, and the diameters of the third lens group G3 and fourth lens group G4 should become excessively great. As a result, it is difficult to implement to make the lens systems compact. Also, if the condition is $0 \leq \beta_{2W} \leq 1$, a real image is formed between the first lens group G1 and second lens group G2. Therefore, it is inevitable to construct a refocusing system after the second lens group G2. As a result, the total length of the optical system becomes extremely long, which is not preferable.

Also, in a zoom lens according to the present invention, there is a special driving mode that the forth lens group G4 is driven in the direction toward the image side when a zooming takes place from the wide angle end to the telescopic end as in the above-mentioned case. Now, given the magnification of the fourth lens group G4 at the wide angle end in this case as $\beta_{4W}$, it is preferable to satisfy the following condition:

$$-1 < \beta_{4W} < 1 \qquad (103)$$

Beyond the range of the condition (103), the fourth lens group G4 is driven in the direction toward the object when a zooming takes placed from the wide angle end to the telescopic end. Then, the driving mode is different from the one according to the present invention, and the variation of the exit pupil by the zooming b will become extremely great.

Now, in order to secure a back focus by reducing the driving amount of the fourth lens group G4 in the direction toward the image when a zooming is executed from the wide angle end to the telescopic end by a zoom lens according to the present invention, the first lens group G1 is driven in the direction toward the object as shown in FIG. 5 to serve the purpose.

On the other hand, in order to secure a back focus while the first lens group G1 is being fixed against the image surface, it is desirable to satisfy the following condition:

$$\beta_{4W} < 1.8 - 0.8Z \qquad (104)$$

Unless this condition is satisfied, it becomes difficult to secure a back focus sufficiently at the telescopic end, and if it is intended to secure the back focus forcibly, the structure of the fourth lens group G4 should inevitably become complicated.

In this respect, when a zoom lens according to the present invention is zoomed from the wide angle end to the telescopic end, it is preferable to drive the third lens group G3 as shown in FIG. 2 through FIG. 6 for attaining the complete restraint of the variation of the exit pupil in a better condition.

Subsequently, the detailed description will be made of the lens structure and driving mode for each of the embodiments.

At first, in the first embodiment, the first lens group G1 having the positive refracting power is formed, as shown in FIGS. 1A, 1B, and 1C, by a biconvex positive lens $L_{11}$ and a negative meniscus lens $L_{12}$ coupled thereto with its convex plane facing the image side. The second lens group G2 having the negative refracting power is formed by a positive meniscus lens $L_{21}$ with its convex plane facing the image side and a negative lens $L_{22}$ coupled thereto, and a biconcave negative lens $L_{23}$. Then, the third lens group G3 and fourth lens group G4 are respectively formed by biconvex positive lenses $L_{31}$ and $L_{41}$ and the negative lenses $L_{32}$ and $L_{42}$ coupled thereto.

Then, the driving mode of the first embodiment based on the above-mentioned lens structure is that when a variable power takes place from the wide angle end (FIG. 1A) to the telescopic end (FIG. 1C), the first lens group G1 and third lens group G3 are fixed with respect to the image surface, and while the spatial interval on the optical axis between the plane of the second lens group G2, which is the closest to the image surface, and the plane of the fourth lens group G4, which is the closest to the object side, sandwiching the third lens group G3, is being increased, the second lens group G2 and fourth lens group G4 are driven toward the image side.

Now, as clear from FIG. 1A, the entrance pupil is at a position 150 mm from the first plane of the first lens group in the direction toward an object and the exit pupil is respectively at positions (a) 312.5 mm, (b) 403.6 mm, and (c) 323.1 mm from the image surface sequentially with (a) f=200 mm, (b) f=300 mm, and (c) f=400 mm. Thus it is apparent that the variation of the exit pupil is restrained when the variable power takes place from the wide angle end to the telescopic end.

Each item is given below.

In this case, the number at the left-hand side represents the order from the object side. A reference mark r designates the curvature radius of the lens surface; d, the space between the lens surfaces; $v_d$, Abbe's number; $n_d$, a refractive index at d line ($\lambda$=587.6 n); and f, the focal length of the total system. In this respect, each item is also mentioned for each of the embodiments to be described hereunder in the same manner as in the present embodiment.

TABLE 1

Items (First Embodiment)

| No | r | d | $v_d$ | $n_d$ |
|----|---|---|---|---|
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 50.9322 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −265.8200 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −121.7309 | B.f. | | 1.000000 |

Face-to-Face Distance (First Embodiment)

| | f = | | |
|---|---|---|---|
| | 200 | 300 | 400 |
| $d_3$ | 44.15413 | 68.83672 | 74.38978 |
| $d_8$ | 33.79640 | 9.11381 | 3.56075 |
| $d_{11}$ | 30.66645 | 101.04194 | 150.90573 |
| B.f. | 159.48675 | 89.11127 | 39.24747 |
| Magnification of Pupil | −1.562 | −1.345 | −0.808 |

In this respect, the value (First Embodiment) corresponding to each condition is as follows:

$(d_{12T}-d_{12W})/(Bf_W-Bf_T)=0.251$ $\beta_{2W}=-1.54$ $\beta_{4W}=-0.1$

Subsequently, in conjunction with FIGS. 2A, 2B, and 2C, a second embodiment will be described. FIGS. 2A to 2C are views illustrating the arrangement of lenses for the second embodiment.

Here, the descriptions of the same or similar points as in the first embodiment will be omitted.

When driven from the wide angle end (FIG. 2A) to the telescopic end (FIG. 2C), the first lens groups G1 is fixed with respect to the image surface and the second lens group G2 and fourth lens group G4 are both driven to the image side while the spatial interval on the optical axis between the plane of the lens of the second lens group G2, which is the closest to the image side, and the plane of the lens of the fourth lens group G4, which is the closest to the object side, is being driven to the image side. Also, the third lens group G3 is driven so as to decrease the space between the lens groups of the second lens group G2 and this group and to increase the space between the lens groups of the fourth lens group G4 and this group as shown in FIGS. 2A to 2C.

The entrance pupil is at a position 150 mm from the first plane of the first lens group in the direction toward an object, and the exit pupil is respectively at positions (a) 312.5 mm, (b) 314.7 mm, and (c) 313.0 mm from the image surface sequentially with (a) f=200 mm, (b) f=300 mm, and (c) f=400 mm.

The correction of the exit pupil variation is more strictly performed than the first embodiment by the driving of the third lens group G3. Each item for the second embodiment is as follows:

TABLE 2

Item (Second Embodiment)

| No | r | d | $v_d$ | $n_d$ |
|----|---|---|---|---|
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 50.9322 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −265.8200 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −121.7309 | B.f. | | 1.000000 |

Face-to-Face Distance (Second Embodiment)

| | f = | | |
|---|---|---|---|
| | 200 | 300 | 400 |
| $d_3$ | 44.15413 | 70.94020 | 74.73168 |
| $d_8$ | 33.79640 | 10.09640 | 6.79648 |
| $d_{11}$ | 30.66645 | 100.04722 | 149.62641 |
| B.f. | 159.48675 | 78.01988 | 36.95930 |
| Magnification of Pupil | −1.562 | −1.049 | −0.783 |

In this respect, the value (Second Embodiment) corresponding to each condition is as follows:

$(d_{12T}-d_{12W})/(Bf_W-Bf_T)=0.249$ $\beta_{2W}=-1.54$ $\beta_{4W}=-0.1$

Subsequently, in conjunction with FIGS. 3A, 3B, and 3C, a third embodiment will be described. FIGS. 3A to 3C are views illustrating the arrangement of lenses for the third embodiment.

Here, the descriptions of the same or similar points as in the first embodiment will be omitted.

The first lens group G1 is fixed; the second lens groups G2 is driven; the third lens groups G3 is driven; and the fourth lens groups G4 is also driven. The present embodiment has the same driving mode as the second embodiment.

The entrance pupil is at a position 150 mm from the first plane of the first lens group in the direction toward an object, and the exit pupil is respectively at positions (a) 310.3 mm, (b) 309.4 mm, and (c) 309.8 mm from the image surface sequentially with (a) f=200 mm, (b) f=300 mm, and (c) f=400 mm.

The correction of the exit pupil variation is more strictly performed that the first embodiment by the driving of the third lens group G3. Each item for the third embodiment is as follows:

TABLE 3

| Item (Third Embodiment) | | | | |
|---|---|---|---|---|
| No | r | d | $v_d$ | $n_d$ |
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 75.9411 | $d_8$ | | 1.000000 |
| 9 | 200.0000 | 6.5000 | 60.14 | 1.620409 |
| 10 | −130.0730 | 3.0000 | 23.01 | 1.860741 |
| 11 | −369.7622 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −122.1353 | B.f. | | 1.000000 |

| Face-to-Face Distance (Third Embodiment) | | | |
|---|---|---|---|
| | f = | | |
| | 200 | 300 | 400 |
| $d_3$ | 46.98934 | 68.07221 | 69.31558 |
| $d_8$ | 38.81539 | 18.81539 | 3.81539 |
| $d_{11}$ | 30.30581 | 106.85922 | 161.42866 |
| B.f. | 125.67279 | 48.03649 | 7.22368 |
| Magnification of Pupil | −1.549 | −1.031 | −0.775 |

In this respect, the value (Third Embodiment) corresponding to each condition is as follows:

$(d_{12T}-d_{12W})/(Bf_W-Bf_T)=0.188$ $\beta_{2W}=-4.33$ $\beta_{4W}=0.133$

Subsequently, in conjunction with FIGS. 4A, 4B, and 4C, a fourth embodiment will be described. FIGS. 4A to 4C are views illustrating the arrangement of lenses for the fourth embodiment.

Here, the descriptions of the same or similar points as in the first embodiment will be omitted.

The first lens group G1 is fixed; the second lens groups G2 is driven; the third lens groups G3 is driven; and the fourth lens groups G4 is also driven. The present embodiment also has the same driving mode as the second embodiment.

The entrance pupil is at a position 150 mm from the first plane of the first lens group in the direction toward an object, and the exit pupil is respectively at positions (a) 293.0 mm, (b) 295.2 mm, and (c) 296.4 mm from the image surface sequentially with (a) f=200 mm, (b) f=300 mm, and (c) f=400 mm.

The correction of the exit pupil variation is more strictly performed by the driving of the third lens group G3 than the first embodiment. Each item for the fourth embodiment is as follows:

TABLE 4

| Item (Fourth Embodiment) | | | | |
|---|---|---|---|---|
| No | r | d | $v_d$ | $n_d$ |
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |

TABLE 4-continued

| 5 | −44.6231 | 1.6000 | 58.90 | 1.518230 |
|---|---|---|---|---|
| 6 | 200.6085 | 2.4000 | | 1.000000 |
| 7 | −188.2477 | 1.6000 | 55.60 | 1.696800 |
| 8 | 37.5395 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −173.8523 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −113.6289 | B.f. | | 1.000000 |

| Face-to-Face Distance (Fourth Embodiment) | | | |
|---|---|---|---|
| | f = | | |
| | 200 | 300 | 400 |
| $d_3$ | 46.39362 | 74.96337 | 80.18432 |
| $d_8$ | 28.15501 | 16.15501 | 4.65501 |
| $d_{11}$ | 31.38065 | 92.71984 | 136.52271 |
| B.f. | 175.56714 | 97.65820 | 60.14336 |
| Magnification of Pupil | −1.463 | −0.984 | −0.741 |

In this respect, the value (Fourth Embodiment) corresponding to each condition is as follows:

$(d_{12T}-d_{12W})/(Bf_W-Bf_T)=0.293$ $\beta_{2W}=-1$ $\beta_{4W}=-0.297$

Subsequently, in conjunction with FIGS. 5A, 5B, and 5C, a fifth embodiment will be described. FIGS. 5A to 5C are views illustrating the arrangement of lenses for the fifth embodiment.

Here, the descriptions of the same or similar points as in the first embodiment will be omitted.

The first lens group G1, second lens groups G2, third lens groups G3, and fourth lens groups G4 are all driven when a variable power takes place. When driven from the wide angle end (FIG. 5A) to the telescopic end (FIG. 5C), the first lens group G1, third lens group G3 are driven toward the object side, and as shown in FIGS. 5A to 5C, the space between the lens groups of the second lens group G1 and second lens group G2 is increased while the space between the third lens group G3 and this lens group is decreased. Also, the fourth lens group G4 is driven toward the image side so that the spatial interval on the optical axis between the surface of the second lens group G2, which is the closed to the image side, and the lens surface of the fourth lens group G4, which is the closed to the object side, is increased.

The entrance pupil is at a position 150 mm from the first plane of the first lens group G1 in the direction toward an object, and the exit pupil is respectively at positions 312.6 mm, 303.0 mm, and 288.5 mm from the image surface sequentially with f=200 mm, f=300 mm, and f=400 mm.

The back focus Bf at the telescopic end is 50.1 mm, and as compared with the back focus Bf of the second embodiment, it becomes long because the first lens group is driven to the object side. Each item for the fifth embodiment is as follows:

TABLE 5

| Item (Fifth Embodiment) | | | | |
|---|---|---|---|---|
| No | r | d | $v_d$ | $n_d$ |
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |

TABLE 5-continued

| | | | | |
|---|---|---|---|---|
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 50.9322 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −265.8208 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −121.7309 | B.f. | | 1.000000 |

Face-to-Face Distance (Fifth Embodiment)

| | f = | | |
|---|---|---|---|
| | 200 | 300 | 400 |
| $d_3$ | 44.15413 | 68.80962 | 72.48519 |
| $d_8$ | 33.79640 | 17.79640 | 6.79640 |
| $d_{11}$ | 30.66645 | 110.38910 | 163.46280 |
| B.f. | 159.48675 | 86.80325 | 50.05353 |
| Magnification of Pupil | −1.562 | −0.961 | −0.690 |

In this respect, the value (Fifth Embodiment) corresponding to each condition is as follows:

$(d_{12T}-d_{12W})/(Bf_W-Bf_T)=0.259$ $\beta_{2W}=-1.54$ $\beta_{4W}=-0.1$

Subsequently, in conjunction with FIGS. 6A, 6B, and 6C, a sixth embodiment will be described. FIGS. 6A to 6C are views illustrating the arrangement of lenses for the sixth embodiment.

Here, the descriptions of the same or similar points as in the first embodiment will be omitted.

When a variable power takes place, the first lens group G1 is fixed; the second lens groups G2 is driven; the third lens groups G3 is driven; and the fourth lens groups G4 is driven. The present embodiment has the same driving mode as the second embodiment.

The entrance pupil is at a position 150 mm from the first plane of the first lens group G1 in the direction toward an object, and the exit pupil is respectively at positions (a) 332.3 mm, (b) 332.4 mm, and (c) 332.4 mm from the image surface sequentially with (a) f=200 mm, (b) f=300 mm, and (c) f=400 mm.

The correction of the exit pupil variation is more strictly performed by the driving of the third lens group G3. Each item for the sixth embodiment is as follows:

TABLE 6

| Item (Sixth Embodiment) | | | | |
|---|---|---|---|---|
| No | r | d | $v_d$ | $n_d$ |
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 50.9322 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −236.0883 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −124.1565 | B.f. | | 1.000000 |

Face-to-Face Distance (Sixth Embodiment)

| | f = | | |
|---|---|---|---|
| | 200 | 300 | 400 |
| $d_3$ | 44.17310 | 70.90362 | 74.24344 |
| $d_8$ | 31.23069 | 17.65277 | 5.58476 |
| $d_{11}$ | 31.01067 | 100.78910 | 150.47905 |
| B.f. | 155.19381 | 72.26278 | 31.30183 |
| Magnification of Pupil | −1.661 | −1.108 | −0.831 |

In this respect, the value (Sixth Embodiment) corresponding to each condition is as follows:

$(d_{12T}-d_{12W})/(Bf_W-Bf_T)=0.243$ $\beta_{2W}=-1.54$ $\beta_{4W}=-0.0497$

As described above, when a variable power takes place in a zoom lens of a four lens group structure having positive, negative, positive, and positive bowers according to the present invention, the space between the lens groups of the positive first lens group and negative second lens group is increased, and the positive fourth lens group is driven to the image side, thus making it possible to obtain a zoom tube lens of a comparatively simple lens structure in which its entrance pupil is positioned further than the first plane of the first lens group toward the object side, and the variation of its exit pupil due to zooming is extremely small.

What is claimed is:

1. A zoom lens of a four-group structure, comprising the following sequentially from the object side:
   a first lens group having positive refracting power;
   a second lens group having negative refracting power, which is capable of being driven along the optical axis to increase the space between said first lens group and said second lens group when a variable power takes place from the wide angle end to the telescopic end;
   a third lens group having positive refracting power; and
   a fourth lens group having positive refracting power, which is capable of being driven to the image side when a variable power takes place from the wide angle end to the telescopic end to increase the space between said third lens group and said fourth lens group; wherein
   given the lens group spaces on the axis between said first lens group and said second lens group at the wide angle end and telescopic end as $d_{12W}$ and $d_{12T}$ respectively and the back focuses at the wide angle end and telescopic end as $Bf_W$ and $Bf_T$ respectively, said first lens group and said second lens group are structured to satisfy the following conditions:

$0<(d_{12T}-d_{12W})/(Bf_W-Bf_T)\leq 1$, $Bf_W>Bf_T$.

2. A zoom lens according to claim 1, wherein
given the magnification of said second lens group at the wide angle end as $\beta_{2W}$, said second lens group is structured to satisfy the following condition:

$\beta_{2W}>1$ or $\beta_{2W}\leq -1$.

3. A zoom lens according to claim 2, wherein
given the magnification of said fourth lens group at the wide angle end as $\beta_{4W}$, said fourth lens group is structured to satisfy the following condition:

$-1<\beta_{4W}<1$.

4. A zoom lens according to claim 3, wherein
when a zooming is performed, said first lens group is fixed with respect to the image surface, and given the zoom ratio as Z and the magnification of said fourth lens group at the wise angle end as $\beta_{4W}$, said fourth lens group is structured to satisfy the following condition:

$\beta_{4W}<1.8-0.8Z$.

5. A zoom lens of a four-group structure, comprising the following sequentially from the object side:
a first lens group having positive refracting power;
a second lens group having negative refracting power, which is capable of being driven along the optical axis to increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
given the lens group spaces on the axis between said first lens group and said second lens group at the wide angle end and telescopic end as $d_{12W}$ and $d_{12T}$ respectively and the back focuses at the wide angle end and telescopic end as $Bf_W$ and $Bf_T$ respectively, said first lens group and said second lens group are structured to satisfy the following conditions:

$0<(d_{12T}-d_{12W})/(Bf_W-Bf_T)\leqq 1$, $Bf_W>Bf_T$.

and wherein
said first lens group and said third lens group are fixed with respect to the image surface, and said second lens group and said fourth lens group are structured to be driven respectively to the image side when a variable power takes place from the wide angle end to the telescopic end so that the spatial interval on the axis between the lens surface of said second lens group, which is the closest to the image side, and the surface of said fourth lens group, which is the closest to the object side, is increased.

6. A zoom lens of a four-group structure, comprising the following sequentially from the object side:
a first lens group having positive refracting power;
a second lens group having negative refracting power, which is capable of being driven along the optical axis to increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
said first lens group is fixed with respect to the image surface, and said second lens group and said fourth lens group are driven respectively to the image side when a variable power takes place from the wide angle end to the telescopic end, and said third lens group is structured to be movable when a variable power takes place from the wide angle end to the telescopic end so as to decrease the space between said second lens group and said third lens group and to increase the space between the lens groups of said fourth lens group and the third lens group.

7. A zoom lens according to claim 6, wherein given the lens group spaces on the axis between said first lens group and said second lens group at the wide angle end and telescopic end as $d_{12W}$ and $d_{12T}$ respectively and the back focuses at the wide angle end and telescopic end as $Bf_W$ and $Bf_T$ respectively, said first lens group and said second lens group are structured to satisfy the following conditions:

$0<(d_{12T}-d_{12W})/(Bf_W-Bf_T)\leqq 1$, $Bf_W>Bf_T$.

8. A zoom lens of a four-group structure, comprising the following sequentially from the object side:
a first lens group having positive refracting power;
a second lens group having negative refracting power, which is capable of being driven along the optical axis to increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
said first lens group and said third lens group are driven respectively to the object side, and said second lens group is structured to be movable so as to increase the space between the lens groups of said first lens group and the second lens group and to decrease the space between said third lens group and said second lens group.

9. A zoom lens of a four-group structure, comprising the following sequentially from the object side:
a first lens group having positive refracting power;
a second lens group having negative refracting power, which is capable of being driven along the optical axis to increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
said zoom lens is structured in accordance with the data stated in the following table:

| No | r | d | $v_d$ | $n_d$ |
|---|---|---|---|---|
| 1 | 105.5724 | 6.0000 | 67.87 | 1.593189 |
| 2 | −60.2393 | 2.5000 | 35.19 | 1.749501 |

-continued

| | | | |
|---|---|---|---|
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 50.9322 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −265.8200 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −121.7309 | B.f. | | 1.000000 |

Face-to-Face Distance

| | f = | | |
|---|---|---|---|
| | 200 | 300 | 400 |
| $d_3$ | 44.15413 | 68.83672 | 74.38978 |
| $d_8$ | 33.79640 | 9.11381 | 3.56075 |
| $d_{11}$ | 30.66645 | 101.04194 | 150.90573 |
| B.f. | 159.48675 | 89.11127 | 39.24747 |
| Magnification of Pupil | −1.562 | −1.345 | −0.808 |

$(d_{12T} - d_{12W})/(Bf_W - Bf_T) = 0.251$
$\beta_{2W} = -1.54$
$\beta_{4W} = -0.1$ where the number on the left-hand side represents the order from the object side; r, the curvature radius of the lens plane; d, the space between the lens surface; $\nu_d$, the Abbe's number; $n_d$, the refractive index at d line ($\lambda = 587.6$ n); f, the focal length of the total system; $d_{12W}$, the space on the axis between the lens groups of the first lens group and the second lens group at the wide angle end; $d_{12T}$, the space on the axis between the lens groups of the first lens group and the second lens group at the telescopic end; $Bf_W$, the back focus of the zoom lens at the wide angle end; $Bf_T$, the back focus of the zoom lens at the telescopic end; $\beta_{2W}$, the magnification of the second lens group at the wide angle end; and $\beta_{4W}$, the magnification of the fourth lens group at the wide angle end.

10. A zoom lens of a four-group structure, comprising the following sequentially from the object side:
a first lens group having positive refracting power;
a second lens group having negative refracting power, which is capable of being driven along the optical axis to increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
said zoom lens is structured in accordance with the data stated in the following table:

| No | r | d | $\nu_d$ | $n_d$ |
|---|---|---|---|---|
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 50.9322 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −265.8200 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −121.7309 | B.f. | | 1.000000 |

Face-to-Face Distance

| | f = | | |
|---|---|---|---|
| | 200 | 300 | 400 |
| $d_3$ | 44.15413 | 70.94020 | 74.73168 |
| $d_8$ | 33.79640 | 10.09640 | 6.79648 |
| $d_{11}$ | 30.66645 | 100.04722 | 149.62641 |
| B.f. | 159.48675 | 78.01988 | 36.95930 |
| Magnification of Pupil | −1.562 | −1.049 | −0.783 |

$(d_{12T} - d_{12W})/(Bf_W - Bf_T) = 0.249$
$\beta_{2W} = -1.54$
$\beta_{4W} = -0.1$ where the number on the left-hand side represents the order from the object side; r, the curvature radius of the lens plane; d, the space between the lens surfaces; $\nu_d$, the Abbe's number; $n_d$, the refractive index at d line ($\lambda = 587.6$ n); f, the focal length of the total system; $d_{12W}$, the space on the axis between the lens groups of the first lens group and the second lens group at the wide angle end; $d_{12T}$, the space on the axis between the lens groups of the first lens group and the second lens group at the telescopic end; $Bf_W$, the back focus of the zoom lens at the wide angle end; $Bf_T$, the back focus of the zoom lens at the telescopic end; $\beta_{2W}$, the magnification of the second lens group at the wide angle end; and $\beta_{4W}$, the magnification of the fourth lens group at the wide angle end.

11. A zoom lens of a four-group structure, comprising the following sequentially from the object side:
a first lens group having positive refracting power;
a second lens group having negative refracting power, which is capable of being driven along the optical axis to increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
said zoom lens is structured in accordance with the data stated in the following table:

| No | r | d | $\nu_d$ | $n_d$ |
|---|---|---|---|---|
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 75.9411 | $d_8$ | | 1.000000 |
| 9 | 200.0000 | 6.5000 | 60.14 | 1.620409 |
| 10 | −130.0730 | 3.0000 | 23.01 | 1.860741 |
| 11 | −369.7622 | $d_{11}$ | | 1.000000 |
| 12 | 193.7822 | 8.0000 | 67.87 | 1.593189 |

-continued

| 13 | −81.7527 | 3.0000 | 23.01 | 1.860741 |
| 14 | −122.1353 | B.f. | | 1.000000 |

Face-to-Face Distance

| | f = | | |
| --- | --- | --- | --- |
| | 200 | 300 | 400 |
| $d_3$ | 46.98934 | 68.07221 | 69.31558 |
| $d_8$ | 38.81539 | 18.81539 | 3.81539 |
| $d_{11}$ | 30.30581 | 106.85922 | 161.42866 |
| B.f. | 125.67279 | 48.03649 | 7.22368 |
| Magnification of Pupil | −1.549 | −1.031 | −0.775 |

$(d_{12T} - d_{12W})/(Bf_W - Bf_T) = 0.188$
$\beta_{2W} = -4.33$
$\beta_{4W} = 0.133$ where the number on the left-hand side represents the order from the object side; r, the curvature radius of the lens plane; d, the space between the lens surfaces; $\nu_d$, the Abbe's number; $n_d$, the refractive index at d line ($\lambda = 587.6$ n); f, the focal length of the total system; $d_{12W}$, the space on the axis between the lens groups of the first lens group and the second lens group at the wide angle end; $d_{12T}$, the space on the axis between the lens groups of the first lens group and the second lens group at the telescopic end; $Bf_W$, the back focus of the zoom lens at the wide angle end; $Bf_T$, the back focus of the zoom lens at the telescopic end; $\beta_{2W}$, the magnification of the second lens group at the wide angle end; $\beta_{4W}$, the magnification of the fourth lens group at the wide angle end.

12. A zoom lens of a four-group structure, comprising the following sequentially from the object side:
a first lens group having positive refracting power;
a second lens group having negative refracting power, which is capable of being driven along the optical axis increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
said zoom lens is structured in accordance with the data stated in the following table:

| No | r | d | $\nu_d$ | $n_d$ |
| --- | --- | --- | --- | --- |
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 37.5395 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −173.8523 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −113.6289 | B.f. | | 1.000000 |

Face-to-Face Distance f =

| | 200 | 300 | 400 |
| --- | --- | --- | --- |
| $d_3$ | 46.39362 | 74.96337 | 80.18432 |
| $d_8$ | 28.15501 | 16.15501 | 4.65501 |
| $d_{11}$ | 31.38065 | 92.71984 | 136.52271 |
| B.f. | 175.56714 | 97.65820 | 60.14336 |
| Magnification of Pupil | −1.463 | −0.984 | −0.741 |

$(d_{12T} - d_{12W})/(Bf_W - Bf_T) = 0.293$
$\beta_{2W} = -1$
$\beta_{4W} = -0.297$ where the number on the left-hand side represents the order from the object side; r, the curvature radius of the lens plane; d, the space between the lens surfaces; $\nu_d$, the Abbe's number; $n_d$, the refractive index at d line ($\lambda = 587.6$ n); f, the focal length of the total system; $d_{12W}$, the space on the axis between the lens groups of the first lens group and the second lens group at the wide angle end; $d_{12T}$, the space on the axis between the lens groups of the first and the second lens group at the telescopic end; $Bf_W$, the back focus of the zoom lens at the wide angle end; $Bf_T$, the back focus of the zoom lens at the telescopic end; $\beta_{2W}$, the magnification of the second lens group at the wide angle end; and $\beta_{4W}$, the magnification of the fourth lens group at the wide angle end.

13. A zoom lens of a four-group structure, comprising the following sequentially from the object side:
a first lens group having positive refracting power;
a second lens group having negative refracting power, which is capable of being driven along the optical axis to increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
said zoom lens is structured in accordance with the data stated in the following table:

| No | r | d | $\nu_d$ | $n_d$ |
| --- | --- | --- | --- | --- |
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 50.9322 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −265.8208 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −121.7309 | B.f. | | 1.000000 |

Face-to-Face Distance f =

| | 200 | 300 | 400 |
| --- | --- | --- | --- |
| $d_3$ | 44.15413 | 68.80962 | 72.48519 |
| $d_8$ | 33.79640 | 17.79640 | 6.79640 |
| $d_{11}$ | 30.66645 | 110.38910 | 163.46280 |
| B.f. | 159.48675 | 86.80325 | 50.05353 |

| | | | |
|---|---|---|---|
| Magnification of Pupil | −1.562 | −0.961 | −0.690 |

$(d_{12T} - d_{12W})/(Bf_W - Bf_T) = 0.259$
$\beta_{2W} = -1.54$
$\beta_{4W} = -0.1$ where the number on the left-hand side represents the order from the object side; r, the curvature radius of the lens plane; d, the space between the lens surfaces; $v_d$, the Abbe's number; $n_d$, the refractive index at d line (λ=587.6 n); f, the focal length of the total system; $d_{12W}$, the space on the axis between the lens groups of the first lens group and the second lens group at the wide angle end; $d_{12T}$, the space an the axis between the lens groups of the first and the second lens group at the telescopic end; $Bf_W$, the back focus of the zoom lens at the wide angle end; $Bf_T$, the back focus of the zoom lens at the telescopic end; $\beta_{2W}$, the magnification of the second lens group at the wide angle end; and $\beta_{4W}$, the magnification of the fourth lens group at the wide angle end.

14. A zoom lens of a four-group structure, comprising the following sequentially from the object side:
a first lens group having positive refracting power;
a second lens group having negative refracting power, which is capable of being driven along the optical axis to increase the space between said first lens group and said second lens group when a variable power takes place from the wide angle end to the telescopic end;
a third lens group having positive refracting power; and
a fourth lens group having positive refracting power, which is capable of being driven to the image side when a variable power takes place from the wide angle end to the telescopic end to increase the space between said third lens group and said fourth lens group; wherein
said zoom lens is structured in accordance with the data stated in the following table:

| No | r | d | $v_d$ | $n_d$ |
|---|---|---|---|---|
| 1 | 105.5724 | 6.0000 | 67.87 | 1.593189 |
| 2 | −60.2393 | 2.5000 | 35.19 | 1.749501 |
| 3 | −168.7267 | $d_3$ | | 1.000000 |
| 4 | −116.6589 | 3.5000 | 23.01 | 1.860741 |
| 5 | −44.6231 | 1.6000 | 58.90 | 1.518230 |
| 6 | 200.6085 | 2.4000 | | 1.000000 |
| 7 | −188.2477 | 1.6000 | 55.60 | 1.696800 |
| 8 | 50.9322 | $d_8$ | | 1.000000 |
| 9 | 150.9884 | 6.5000 | 60.14 | 1.620409 |
| 10 | −130.0730 | 3.0000 | 23.01 | 1.860741 |
| 11 | −236.0883 | $d_{11}$ | | 1.000000 |
| 12 | 193.7822 | 8.0000 | 67.87 | 1.593189 |
| 13 | −81.7527 | 3.0000 | 23.01 | 1.860741 |
| 14 | −124.1565 | B.f. | | 1.000000 |

| | Face-to-Face Distance | | |
|---|---|---|---|
| | f = | | |
| | 200 | 300 | 400 |
| $d_3$ | 44.17310 | 70.90362 | 74.24344 |
| $d_8$ | 31.23069 | 17.65277 | 5.58476 |
| $d_{11}$ | 31.01067 | 100.78910 | 150.47905 |
| B.f. | 155.19381 | 72.26278 | 31.30183 |
| Magnification of Pupil | −1.661 | −1.108 | −0.831 |

$(d_{12T} - d_{12W})/(Bf_W - Bf_T) = 0.243$
$\beta_{2W} = -1.54$
$\beta_{4W} = -0.0497$ where the number on the left-hand side represents the order from the object side; r, the curvature radius of the lens plane; d, the space between the lens surfaces; $v_d$, the Abbe's number; $n_d$, the refractive index at d line (λ=587.6 n); f, the focal length of the total system; $d_{12W}$, the space on the axis between the lens groups of the first lens group and the second lens group at the wide angle end; $d_{12T}$, the space an the axis between the lens groups of the first and the second lens group at the telescopic end; $Bf_W$, the back focus of the zoom lens at the wide angle end; $Bf_T$, the back focus of the zoom lens at the telescopic end; $\beta_{2W}$, the magnification of the second lens group at the wide angle end; and $\beta_{4W}$, the magnification of the fourth lens group at the wide angle end.

15. A microscope optical system for observing a specimen comprising an objective optical system including a first objective lens system for condensing light from the specimen and a second objective lens system for collecting the light passing through said first objective lens system to form an image of the specimen, said second objective lens system including a zoom optical system which changes a magnification of the image of the specimen while correcting a change of a position of the image of the specimen and a change of a position of a pupil of said objective optical system.

16. A microscope optical system according to claim 15, wherein said zoom optical system contains a plurality of moving lens groups which move along the optical axis.

17. A microscope optical system according to claim 15, wherein said zoom optical system includes a first lens group having positive refractive power, a second lens group having negative refractive power, a third lens group having positive refractive power and a fourth lens group having positive refractive power, and wherein when the zooming is performed from the wide angle end to the telephoto end, said zoom optical system changes in order that an air spacing between said first lens group and said second lens group increases, thus resulting in increasing an air spacing between said third lens group and said fourth lens group.

18. A microscope optical system according to claim 17, wherein when an axial distance between said first lens group and said second lens group at the wide angle end and at the telephoto end are designated by $d_{12W}$ and $d_{12T}$, respectively, and backfocus at the wide angle end and at the telephoto end are designated by $Bf_W$ and $Bf_T$, respectively, the microscope optical system satisfies the following conditions:

$$0 < (d_{12T} - d_{12W})/(Bf_W - Bf_T) \leq 1, Bf_W > Bf_T.$$

19. A microscope optical system according to claim 18, wherein when the zooming is performed, said second and fourth lens groups move along the optical axis.

20. A microscope optical system according to claim 18, wherein when the zooming is performed, said second, third and fourth lens groups move along the optical axis.

21. A microscope optical system according to claim 18, wherein when a magnification of said second lens group at the wide angle end is designated by $\beta_{2W}$, the microscope optical system satisfies the condition:

$$\beta_{2W} > 1 \text{ or } \beta_{2W} \leq -1.$$

22. A microscope optical system according to claim 21, wherein when a magnification of said fourth lens group at the wide angle end is designated by $\beta_{4W}$, the microscope optical system satisfies the condition:

$$-1 < \beta_{4W} < 1.$$

23. A microscope optical system according to claim 22, wherein when the zooming is performed, said first lens group is fixed with respect to an image surface, and wherein when zoom ratio is designated by Z, and a magnification of said fourth lens group at the wide angle end is designated by $\beta_{4W}$, the microscope optical system satisfies the condition:

$$\beta_{4W} < 1.8 - 0.8 \ Z.$$

24. A zoom lens comprising a first lens group having positive refractive power, a second lens group having negative refractive power, a third lens group having positive refractive power and a fourth lens group having positive refractive power; wherein zooming is performed by changing a distance between said first lens group and said second lens group and by changing a distance between said third lens group and said fourth lens group; and wherein when axial distances between said first and second lens groups at the wide angle end and at the telephoto end are designated by $d_{12W}$ and $d_{12T}$, respectively, and backfocus at the wide angle end and the telephoto end is designated by $Bf_W$ and $Bf_T$, respectively, the zoom lens satisfies the conditions:

$$0 < (d_{12T} - d_{12W})/(Bf_W - Bf_T) \leq 1, \ Bf_W > Bf_T.$$

25. A zoom lens according to claim 24, wherein when a magnification of said second lens group at the wide angle end is designated by $\beta_{2W}$, the zoom lens satisfies the condition:

$$\beta_{2W} > 1 \text{ or } \beta_{2W} \leq -1.$$

26. A zoom lens according to claim 25, wherein a magnification of said fourth lens group at the wide angle end is designated by $\beta_{4W}$, the zoom lens satisfies the condition:

$$-1 < \beta_{4W} < 1.$$

27. A zoom lens according to claim 26, wherein when the zooming is performed, said first lens group is fixed with respect to an image surface, and wherein when zoom ratio is designated by Z, and a magnification of said fourth lens group at the wide angle end is designated by $\beta_{4W}$, the zoom lens satisfies the condition:

$$\beta_{4W} < 1.8 - 0.8 \ Z.$$

* * * * *